(12) United States Patent
Tran-Kiem et al.

(10) Patent No.: US 11,663,557 B2
(45) Date of Patent: May 30, 2023

(54) SNAPSHOT CALENDAR VIEW INTERFACES

(71) Applicant: Rubrik, Inc., Palo Alto, CA (US)

(72) Inventors: Vinh-Nhan Tran-Kiem, Sacramento, CA (US); Pranava Adduri, Fremont, CA (US); Claudia Yu, San Francisco, CA (US); Xiao Yu, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 48 days.

(21) Appl. No.: 16/718,782

(22) Filed: Dec. 18, 2019

(65) Prior Publication Data

US 2020/0193388 A1   Jun. 18, 2020

Related U.S. Application Data

(60) Provisional application No. 62/781,451, filed on Dec. 18, 2018.

(51) Int. Cl.
| | |
|---|---|
| *G06F 3/0484* | (2022.01) |
| *G06Q 10/1093* | (2023.01) |
| *G06F 16/11* | (2019.01) |
| *G06F 3/0482* | (2013.01) |
| *G06F 3/04817* | (2022.01) |

(52) U.S. Cl.
CPC ....... *G06Q 10/1093* (2013.01); *G06F 3/0482* (2013.01); *G06F 3/0484* (2013.01); *G06F 3/04817* (2013.01); *G06F 16/128* (2019.01)

(58) Field of Classification Search
CPC .............. G06Q 10/1093; G06F 3/0484; G06F 16/128; G06F 3/0482; G06F 3/04817
USPC .......................................................... 715/764
See application file for complete search history.

(56) References Cited

U.S. PATENT DOCUMENTS

| | | | | |
|---|---|---|---|---|
| 8,943,441 | B1* | 1/2015 | Patrick ................. | G06F 3/0484 715/853 |
| 10,866,742 | B1* | 12/2020 | Patterson ............... | G06F 3/067 |
| 2005/0234931 | A1* | 10/2005 | Yip ..................... | H04L 41/5054 |
| 2008/0034307 | A1* | 2/2008 | Cisler ................. | G06F 3/04815 715/764 |
| 2010/0312754 | A1* | 12/2010 | Bear ..................... | G06F 16/134 707/685 |
| 2012/0290982 | A1* | 11/2012 | Hallock ............... | G06F 3/0485 715/828 |
| 2014/0006465 | A1* | 1/2014 | Davis .................... | G06F 16/183 707/827 |
| 2015/0309881 | A1* | 10/2015 | Holmes .............. | G06F 11/1456 707/649 |
| 2015/0372829 | A1* | 12/2015 | Joshi .................... | G06F 3/0482 709/206 |
| 2017/0169383 | A1* | 6/2017 | Schmidt ......... | G06Q 10/063114 |

* cited by examiner

*Primary Examiner* — Dino Kujundzic
*Assistant Examiner* — Jianmei F Duckworth
(74) *Attorney, Agent, or Firm* — Holland & Hart LLP

(57) ABSTRACT

In some examples, a computer-implemented method of providing a calendar view interface in a client device includes receiving a request for a calendar view interface from the client device, determining a period of time to be presented in the calendar view interface, generating a calendar view interface for the period of time including an indicator for each day of the time period, retrieving snapshot information for the period of time, and generating a snapshot indicator for each day within the time period based on the snapshot information.

19 Claims, 19 Drawing Sheets

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
|  | ... |  |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |
| m001.im5-1 | |

FIG. 4D

┌─────────── Year View Interface 800 ───────────┐
│                                                │
│ Today                          Year Month Day  │
│                                    ─── │
├────────────────────────────────────────────────┤
│                                                │
│              ⟨      2018      ⟩                │
│                                                │
└────────────────────────────────────────────────┘

|        January        |       February        |        March          |        April          |
|                       |                       |                       |                       |
| 1  2  3  4  5  6      |          1  2  3      |          1  2  3      | 1  2  3  4  5  6  7   |
| 7  8  9 10 11 12 13   | 4  5  6  7  8  9 10   | 4  5  6  7  8  9 10   | 8  9 10 11 12 13 14   |
|14 15 16 17 18 19 20   |11 12 13 14 15 16 17   |11 12 13 14 15 16 17   |15 16 17 18 19 20 21   |
|21 22 23 24 25 26 27   |18 19 20 21 22 23 24   |18 19 20 21 22 23 24   |22 23 24 25 26 27 28   |
|28 29 30 31            |25 26 27 28            |25 26 27 28 29 30 31   |29 30                  |

|         May           |         June          |         July          |        August         |
| 1  2  3  4  5         |          1  2         | 1  2  3  4  5  6  7   |          1  2  3  4   |
| 6  7  8  9 10 11 12   | 3  4  5  6  7  8  9   | 8  9 10 11 12 13 14   | 5  6  7  8  9 10 11   |
|13 14 15 16 ▒  ▒  ▒    |10 11 12 13 14 15 16   |15 16 17 18 19 20 21   |12 13 14 15 16 17 18   |
|▒  ▒  ▒ 23 24 25 26    |17 18 19 20 21 22 23   |22 23 24 25 26 27 28   |19 20 21 22 23 24 25   |
|27 28 29 30 31         |24 25 26 27 28 29 30   |29 30 31               |26 27 28 29 30         |

|       September       |        October        |       November        |       December        |
|                    1  | 1  2  3  4  5  6      |          1  2  3      |                    1  |
| 2  3  4  5  6  7  8   | 7  8  9 10 11 12 13   | 4  5  6  7  8  9 10   | 2  3  4  5  6  7  8   |
| 9 10 11 12 13 14 15   |14 15 16 17 18 19 20   |11 12 13 14 15 16 17   | 9 10 11 12 13 14 15   |
|16 17 18 19 20 21 22   |21 22 23 24 25 26 27   |18 19 20 21 22 23 24   |16 17 18 19 20 21 22   |
|23 24 25 26 27 28 29   |28 29 30 31            |25 26 27 28 29 30      |23 24 25 26 27 28 29   |
|30                     |                       |                       |30 31                  |

Month View Interface 900

Today                                                    Year <u>Month</u> Day

‹ May 2018 ›

| S | M | T | W | T | F | S |
|---|---|---|---|---|---|---|
|   |   | 1 | 2 | 3 | 4 | 5 |
|   |   |   |   | 802 |   |   |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |   |   |

FIG. 9

SNAPSHOT CALENDAR VIEW INTERFACES

CLAIM OF PRIORITY

This Application claims the benefit of U.S. Provisional Application Ser. No. 62/781,451, filed Dec. 18, 2018, which is hereby incorporated by reference in its entirety.

BACKGROUND

1. Technical Field

Embodiments generally relates to user interfaces for managing, storing, and recovering data.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms.

Thus, there is a need for better approaches to managing and storing data, particularly across different virtual machine platforms. Furthermore, there is a need for user interfaces for efficient control of the managing and storing of the data.

SUMMARY

A data management and storage (DMS) cluster of peer DMS nodes provides calendar view interfaces for managing snapshot jobs for machines of a compute infrastructure. In some embodiments, a peer DMS node of the DMS cluster generates a calendar view interface by retrieving snapshot information associated with a period of time and provides the calendar view interface to a client device. A calendar view interface enables a user to view the frequency and health of snapshot jobs from multiple time vantage points, and in a chronological order. The calendar view interface provides allows a user to efficiently access particular snapshot jobs, manage the snapshot jobs, and perform various operations on the snapshot jobs.

Other aspects include components, devices, systems, improvements, methods, processes, applications, computer readable mediums, and other technologies related to any of the above.

BRIEF DESCRIPTION OF THE DRAWINGS

FIGS. 3A-3C are DMS tables that illustrate operation of the system of FIGS. 1-2, according to one embodiment.

FIGS. 4A-4D are DMS tables that illustrate updating of snapshot images, according to one embodiment.

FIG. 9 is an example of a day view interface, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Embodiments relate to providing calendar view interfaces for managing snapshots of machines of a compute infrastructure. For example, a peer data management and storage (DMS) node of a DMS cluster generates a calendar view interface by retrieving snapshot information associated with a period of time and provides the calendar view interface to a client device. The calendar view interface enables a user to view the frequency and health of the snapshot jobs from multiple time vantage points. For example, the calendar view interface may include a year view interface for displaying snapshot information for a year, a month view interface for displaying snapshot information for a month, or a day view interface for display snapshot information for a day. As such, users are able to determine whether snapshot jobs are being completed in an efficient manner and provide various controls for managing the snapshots jobs.

Figure 1:
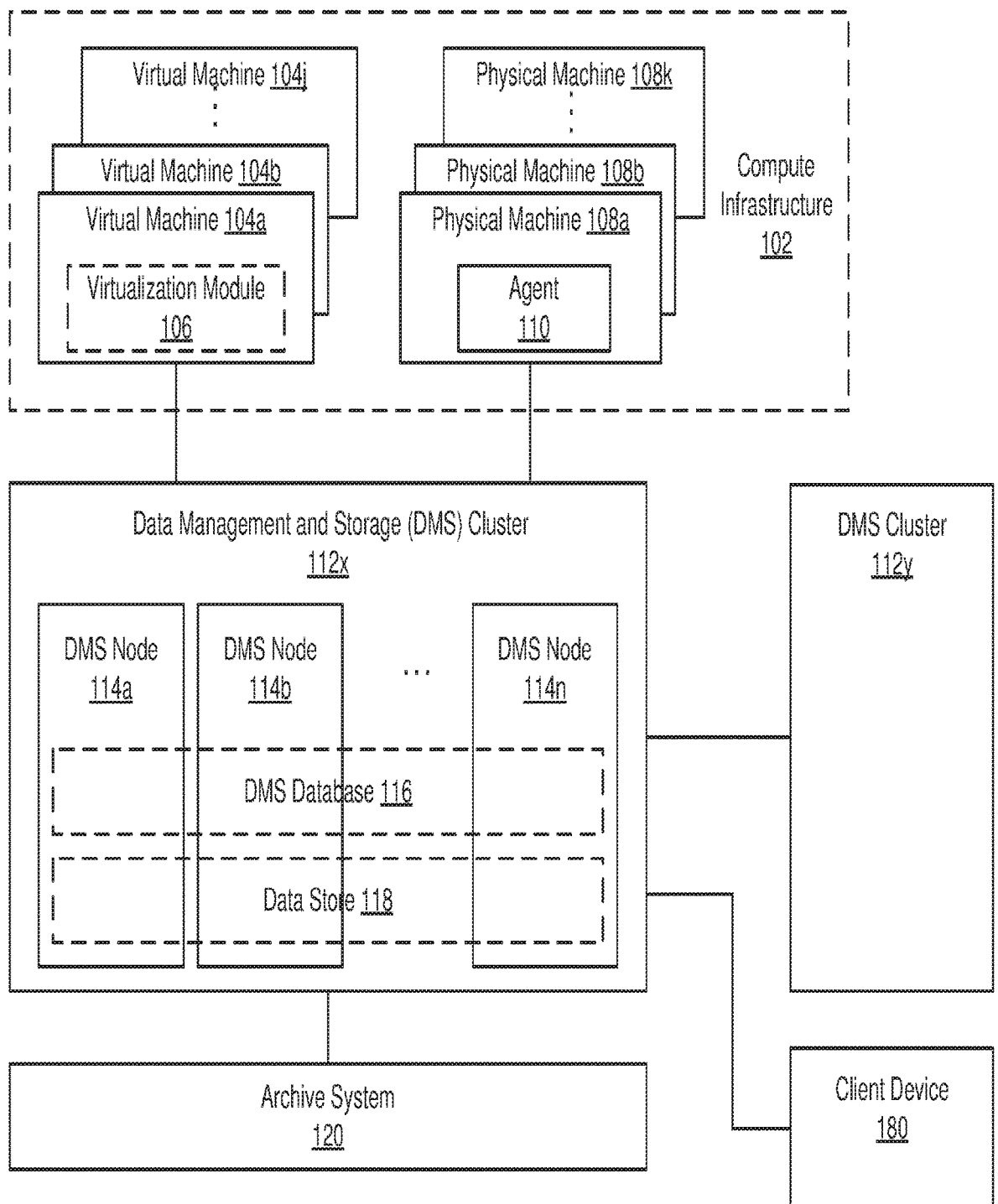
FIG. 1 is a block diagram of a system for managing and storing data, according to one embodiment.

In more detail, FIG. 1 is a block diagram illustrating a system for managing and storing data, according to one embodiment. The system includes a data management and storage (DMS) cluster 112*x*, a secondary DMS cluster 112*y* and an archive system 120. The DMS system provides data management and storage services to a compute infrastructure 102, which may be used by one or more tenants. Examples of tenants may include an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

The compute infrastructure 102 includes both virtual machines (VMs) 1104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples. In some embodiments, the virtual machines 104 are software simulations of computing systems that execute on one or more of the physical machines 108. Each physical machine 108 may be a host machine that includes a hypervisor that create and executes one or more virtual machines 104 of tenants 122.

The DMS cluster 112 manages and stores data for the compute infrastructure 102, such as for one or more tenants of the compute infrastructure. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

In some embodiments, the DMS cluster 112 provides the DMS services as a managed service provider (MSP) to one or more tenants of the compute infrastructure 102. In some embodiments, the DMS cluster 112 may be connected to multiple compute infrastructures 102 to provide the DMS services.

Archive system 120 archives data for the computer infrastructure 102. The archive system 120 may be a cloud service. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines, and in some embodiments, may be implemented in the compute infrastructure 102 or some other compute infrastructure. The DMS nodes 114 are interconnected with each other, for example, via cable, fiber, backplane, and/or network switch. In some embodiments, the end user does not interact separately with each DMS node 114 but interacts with the DMS nodes 114a-n collectively as one entity, namely, the DMS cluster 112. For example, the DMS nodes 114 may be peer DMS nodes each having the capability to perform DMS services, either individually or by working with other DMS nodes 114.

The DMS nodes 114 are peers and preferably each DMS node 114 includes common functionality. The DMS cluster 112 automatically configures the DMS nodes 114 as new nodes are added to the DMS cluster 112 or existing nodes are dropped or fail. For example, the DMS cluster 112 automatically discovers new nodes, or otherwise may control the allocation of DMS nodes 114 to the DMS cluster 112. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

A client device 180 is connected to the DMS cluster 112 to manage snapshot jobs for a compute infrastructure 102. In some embodiments, the client device 180 is a virtual machine 104 or a physical machine 108 of the compute infrastructure 102. The DMS cluster 112 provides calendar view interfaces to the client device 180 for viewing snapshot jobs and managing the snapshot jobs.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
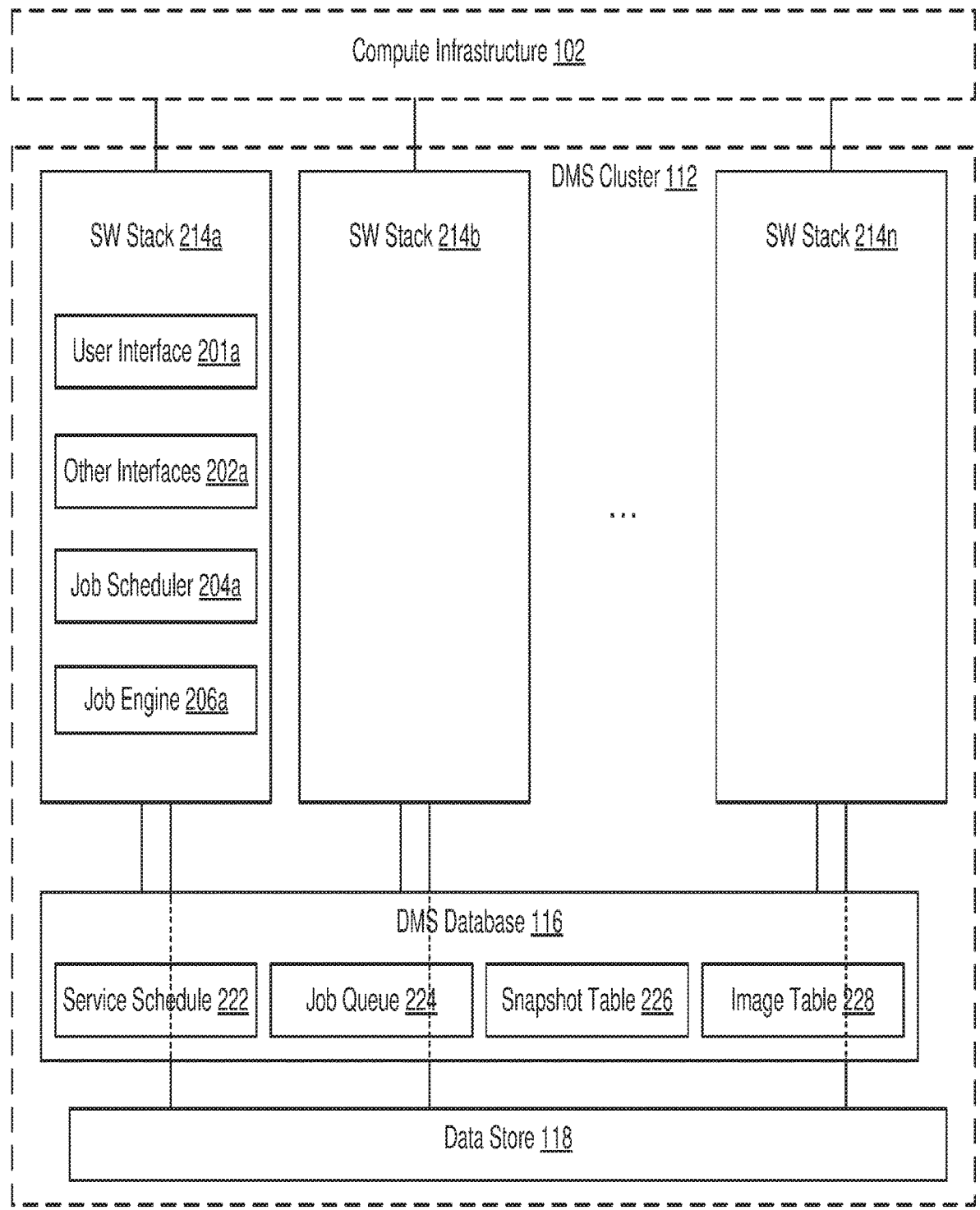
FIG. 2 is a logical block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2A. The stack 214a includes a user interface 201a, other interfaces 202a, job scheduler 204a, and a job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables, but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics. In some embodiments, the user interface 201 includes one or more calendar view interfaces such as a year view interface, a month view interface, or a day view interface. These interfaces provide informational displays for snapshot jobs within respective time frames and allows a user to manage the snapshot jobs.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. A pull snapshot job is also referred to herein as a "snapshot job." Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIGS. 3 and 4 below.

DMS database 116 also stores snapshot information or metadata information for the data in the data store 118. The metadata information may include file names, file sizes, permissions for files, and various times such as when the file was created or last modified. The metadata information may further include snapshot information indicating whether a snapshot job was successful, failed, or in progress (e.g., still indexing), the scheduled snapshot time for a snapshot job, the location of the stored snapshots, among other things.

FIGS. 3 and 4 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the envoy or DMS cluster can find the machine in the compute infrastructure. In this example, there is a mix of virtual machines (VMxx) and physical machines (PMxx). The machines are also identified by machine_id, which is a unique ID used internally by the DMS cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

FIGS. 5 through 10 are examples of calendar view interfaces for managing snapshot jobs. A calendar view interface is an example of a user interface 201 provided by a DMS node 114 of a DMS cluster 112, such as to a client device 180. Each calendar view interface provides snapshot information regarding snapshot jobs for a period of time, such as a year, month, week, or day.

Figure 5:
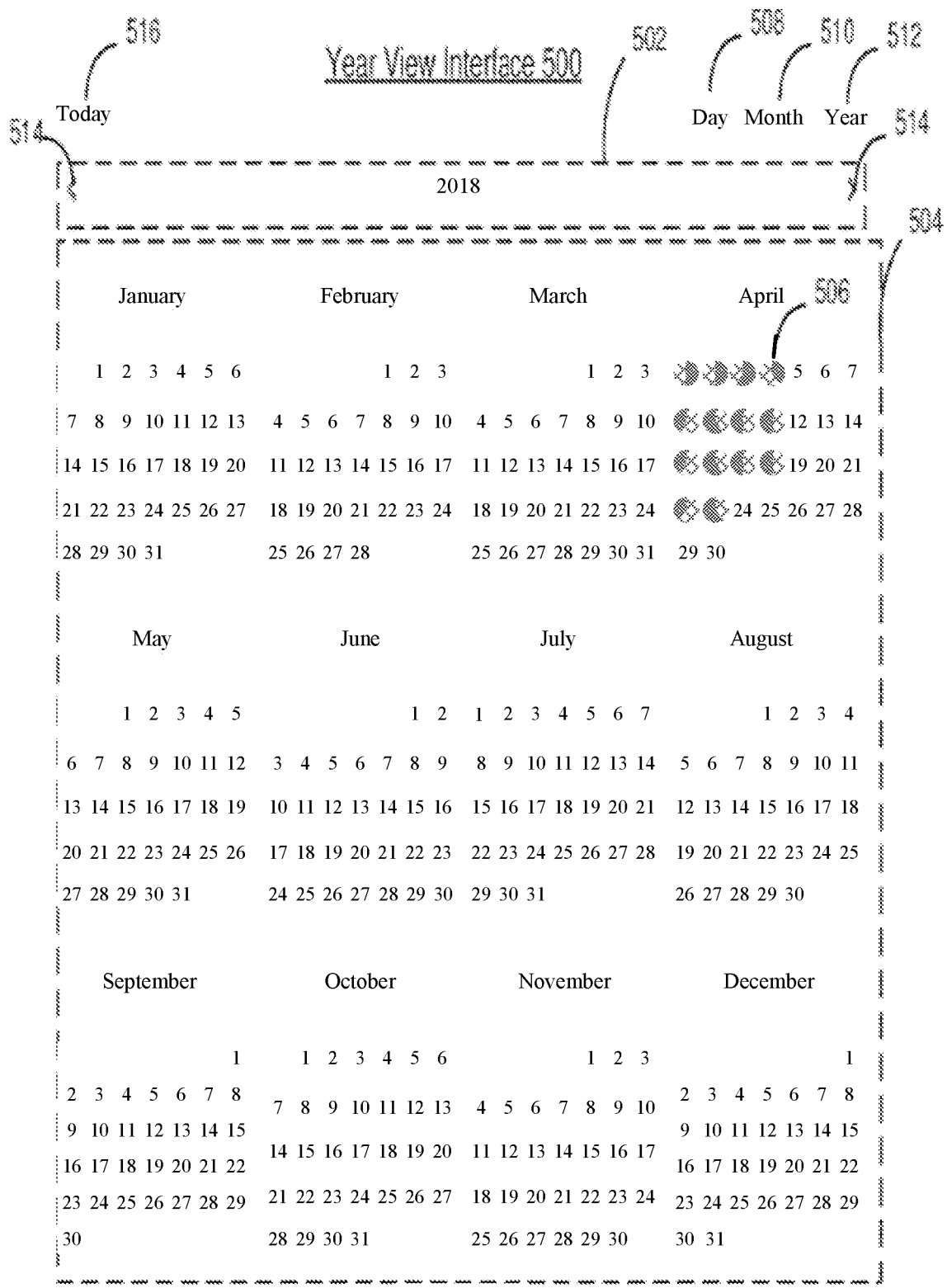
FIG. 5 is an example of a year view interface, according to one embodiment.

FIG. 5 is an example of a year view interface 500, according to one embodiment. The year view interface 500 provides snapshot information for snapshot jobs performed in a time period of a year. The year view interface 500 includes a year selection region 502 and a year snapshot display 504. The year snapshot display 504 provides a display of months and days of a selected year (e.g., 2018). Each day of the year is displayed within a cell. For each day in the year, a snapshot indicator 506 indicates the percentage of snapshot jobs that have been successfully completed, failed, or are still in progress (e.g., indexing). The year view interface 500 provides a view of the frequency and health of snapshot jobs. The year view interface 500 may further provide references to other calendar views and snapshot management interfaces, such as a month view interface or a day view interface.

Indexing refers to a process of examining the contents of a snapshot. A snapshot is a point in time backup of a resource i.e. a virtual machine, physical machine, databases, etc. In the case of a resource whose backup is either a full disk or a set of files and folders (e.g., VMs, physical machines), the backup/snapshot that is taken can be examined and all its contents are indexed for quick search and retrieval. Once a snapshot is indexed, the index can be searched to see if a certain file was present in that snapshot. The index also contains information of how to quickly access that file from the snapshot for usage/retrieval. A snapshot might fail its indexing if the ingested backup is corrupted. Corruption can be caused by reasons such as the ingested disk might be encrypted, network issues, etc. A snapshot may be indexing when a DMS cluster is backlogged with indexing jobs, or if the snapshot is particularly large, the indexing might take some time and has not completed.

A snapshot indicator 506 provides an efficient way of conveying the status of snapshot jobs for a day. Each snapshot indicator 506 may be represented by a shape (e.g., a circle) and utilize a color code. For example, a green portion of the snapshot indicator 506 may represent a percentage of the snapshot jobs that were successful, a red portion of the snapshot indicator 506 may represent a percentage of the snapshot jobs that failed, and a yellow portion of the snapshot indicator 506 may represent a percentage of the snapshot jobs that is still indexing. As shown in FIG. 5, the day of April $1^{st}$ includes a full green circle to indicate that each snapshot job attempted on the day was successfully captured. The day of April $2^{nd}$ includes a green half circle and a red half circle indicating that half of the snapshot jobs attempted on the day were successfully captured, and another half of the snapshot jobs attempted on the day failed. The day of April $3^{rd}$ includes a green half circle and a yellow half circle indicating that half of the snapshot jobs attempted on the day were successfully captured, and another half of the snapshot jobs attempted on the day are being indexed. A snapshot job may be attempted in accordance with parameters of a service schedule 222, or on demand in response to a user input. As such, the snapshot indicator 506 indicates whether snapshots are being captured in an efficient manner. The color code and shape of a snapshot indicator 506 may vary. No snapshot indicator 506 is shown for days in the future or days where no snapshot jobs were scheduled or otherwise initiated.

The year view interface 500 may further include view selection buttons 508, 510, and 512 for selecting different calendar view interfaces. A day view selection button 508 may be used to select a day view interface, a month view selection button 510 may be used to select a month view interface, and a year view selection button 512 may be used to select a year view interface.

The year selection region 502 includes selection buttons 514 for selecting the year, with snapshot information for a selected year being displayed as shown for the year 2018 in FIG. 5. The year view interface 500 may further include a today selection button 516 for selecting a day view interface for the current day. This allows a user to quickly access recent snapshot information.

Figure 6:
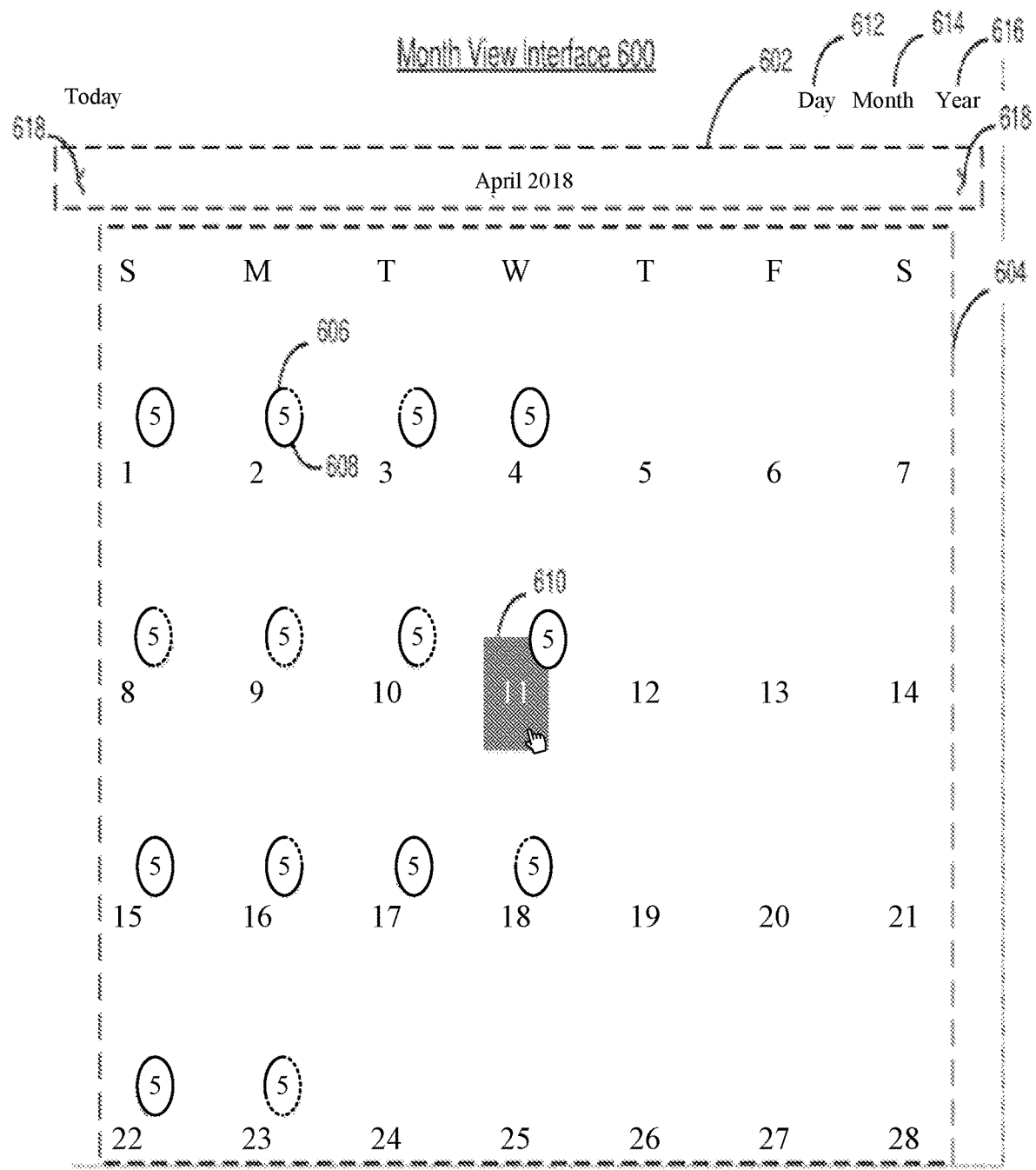
FIG. 6 is an example of a month view interface, according to one embodiment.

FIG. 6 is an example of a month view interface 600, according to one embodiment. The month view interface 600 provides a view of each day in a month. The month view interface 600 includes a month selection region 602 and a month snapshot display 604. For each day of a selected month, a snapshot indicator 606 indicates the percentage of snapshot jobs that have are successful, failed or still indexing. However, rather than the different color portions representing successful, unsuccessful, or indexing snapshot jobs filling the entire indicator as shown for the snapshot indicator 506, the different color portions of the snapshot indicator 606 only fill a border portion of the snapshot indicator 606. Within the border portion, a snapshot attempt count 608 indicates the number of snapshot jobs that were attempted that day. A fill 610 may be presented when a user (e.g., mouse cursor) hovers over a day.

Because fewer days are included in the month view interface 600 than the year view interface 500, there is space for larger indicators. Accordingly, a snapshot indicator 606 can provide more information than a snapshot indicator 506. Various types of snapshot indicators may be used for the various calendar view interfaces. In some embodiments, the type of snapshot indicator that is used depends on the number of days that are displayed in the calendar view interface. If the number of days exceeds a threshold, for example, then a less detailed snapshot indicator may be used for each day. The month view interface 600 may further include view selection buttons 612, 614, and 616 for selecting different calendar view interfaces. A day view selection button 612 may be used to select a day view interface, a month view selection button 614 may be used to select a month view interface, and a year view selection button 616 may be used to select a year view interface.

The month selection region 602 includes month selection buttons 618 for selecting a month, with the data for the days of the selected month being displayed as shown for the month of April 2018 in FIG. 6. The month selection button 618 on the left side selects a previous month to the displayed month, and the month selection button 618 on the right side selects a subsequent month to the displayed month.

The month view interface 600 may be provided in response to user selection of a month in the year view interface 500, or in response to user selection of a month view selection button in another calendar view interface (e.g., month view selection button 510 in the year view interface 500). In some embodiments, selection of a month view selection button results in snapshot information for the current month being displayed in the month view interface 600.

Figure 7:
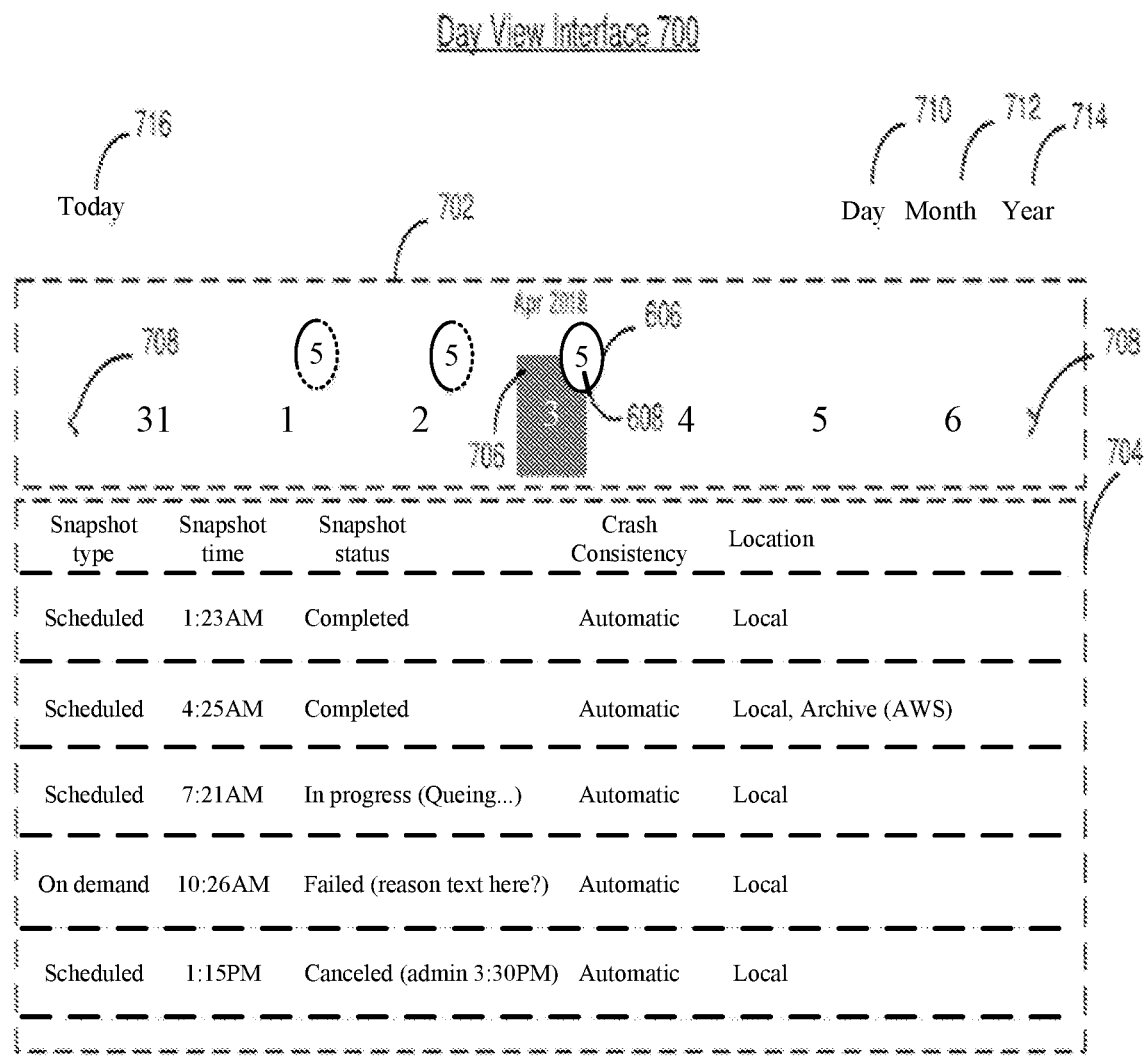
FIG. 7 is an example of a day view interface, according to one embodiment.

FIG. 7 is an example of a day view interface 700, according to one embodiment. The day view interface 700 includes a week selection carousel 702 and a day snapshot display 704. The week selection carousel 702 provides a display of days in a selected week. For each day, a snapshot indicator 606 indicates the percentage of snapshot jobs that are successful, failed, or still indexing, and the snapshot attempt count 608. The week selection carousel 702 further includes week selection buttons 708 for selecting the week that is displayed in the day snapshot display 704. The week selection button 708 on the left side selects a previous week to the week displayed in the week selection carousel 702, and the week selection button 708 on the right side selects a subsequent week to the week displayed in the week selection carousel 702. Selection of a particular day in the week selection carousel 702 results in detailed information about the snapshot jobs for the day being displayed in the day snapshot display 704. In the example shown in FIG. 7, the day of April $3^{rd}$, 2018 is selected for display in the day snapshot display 704 as indicated by a fill 706.

The day snapshot display 704 provides details of snapshot jobs for the day. For the day of Apr 3, 2018, the five attempted snapshot jobs are listed in a table along with additional snapshot information. Some examples of the information data that may be displayed include snapshot type, snapshot time, snapshot status, crash consistency, and storage location. Each of these items correspond to a column in the table, with each row corresponding to a particular snapshot job. Snapshot type defines a category of the snapshot job, such as a scheduled snapshot (e.g., as defined by a service schedule 222) or an on-demand snapshot. The snapshot time defines a time that a snapshot job was scheduled or initiated on demand. The snapshot status defines the state of the snapshot job and may include an indication that the snapshot job was successfully completed, indexing (e.g., in progress), or failed (e.g., failed or canceled). The snapshot status of the snapshot jobs for each day corresponds with the information presented by the snapshot indicator 606 for the day. The snapshot status may further include detailed information regarding the snapshot jobs. For an in-progress snapshot job, an operation that is being executed or waiting to be executed may be shown. For a failed snapshot job, a reason for the failure may be shown. For a canceled snapshot job, a user that canceled the snapshot job and the time of cancelation may be shown. Crash consistency defines a consistency level of the snapshot. A consistency level refers to the state of the system when the backup was performed. A crash consistent backup can be analogized to having a physical computer running, pulling the plug and shutting everything down immediately, and then taking the hard disk and making a full byte for byte backup of it. This is a low level of consistency. For example, if a machine is running a database, the database might have been in the middle of writing a transaction to disk, a crash consistent backup won't wait for that transaction to be written so the backup may be in an unknown state. A higher level of consistency is an application consistent backup that lets the system arrange itself into a good state before taking a backup of the disk. For example, a database may be placed in a consistent state before the backup is taken. Location defines the storage destination of the snapshot. "Local" refers to a location in the DMS cluster 112 (e.g., data store 118), "archive" refers to storage in an archive system 120, and "replicated" refers to replication to another DMS cluster 112.

In some embodiments, each snapshot job in the day snapshot display 704 may be selected to provide management functionality for the snapshot job using the day view interface 700. Additional details regarding snapshot management and interfaces to facilitate the management are discussed below in connection with FIG. 10.

In some embodiments, the day view interface 700 further includes a day view selection button 710 to select a day view interface, a month view selection button 712 to select a month view interface, a year view selection button 714 to select a year view interface, and a today selection button 716 for selecting a day view interface for the current day.

The day view interface 700 may be provided in response to user selection of a day in the year view interface 500 or the month view interface 600. In another example, the day view interface 700 may be provided in response to selection of a day view selection button 508 in the year view interface 500 or the day view selection button 612 in the month view interface 600.

Figure 8:
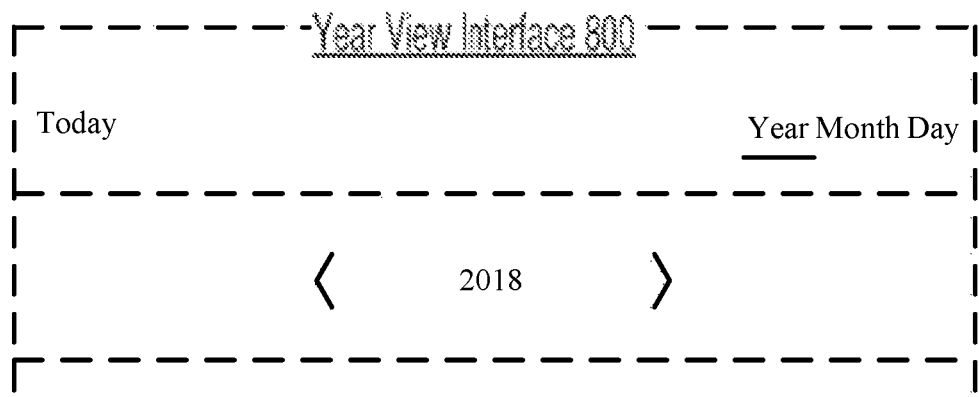
FIG. 8 is an example of a year view interface, according to one embodiment.

FIG. 8 is an example of a year view interface 800, according to one embodiment. The discussion regarding the year view interface 500 of FIG. 5 may be applicable to the year view interface 800. The year view interface 800 includes a snapshot indicator 802 for each day. The snapshot indicator 802 is a different type of snapshot indicator than the snapshot indicator 506 or the snapshot indicator 606. Rather than indicating the relative proportions of successful, failed, and indexing snapshot jobs, the snapshot indicator 802 provides a more succinct indication regarding whether the snapshot jobs of a particular day were successfully taken or not. Each snapshot indicator 802 may be represented by a shape (e.g., circle) and utilize a color code. For example, a green circle may indicate that each snapshot job for the day was successfully taken. A red circle may indicate that at least one snapshot job has failed. In some embodiments, a yellow circle may be used to indicate that at least one snapshot job is indexing, and that no other snapshot jobs have failed. The color code and shape of a snapshot indicator 802 may vary.

FIG. 9 is an example of a month view interface 900, according to one embodiment. The discussion regarding the month view interface 600 of FIG. 6 may be applicable to the month view interface 900. Unlike the month view interface 600, the month view interface 900 uses a snapshot indicator 802 for each day. More generally, various types of snapshot indicators may be used in various calendar view interfaces.

Figure 10:
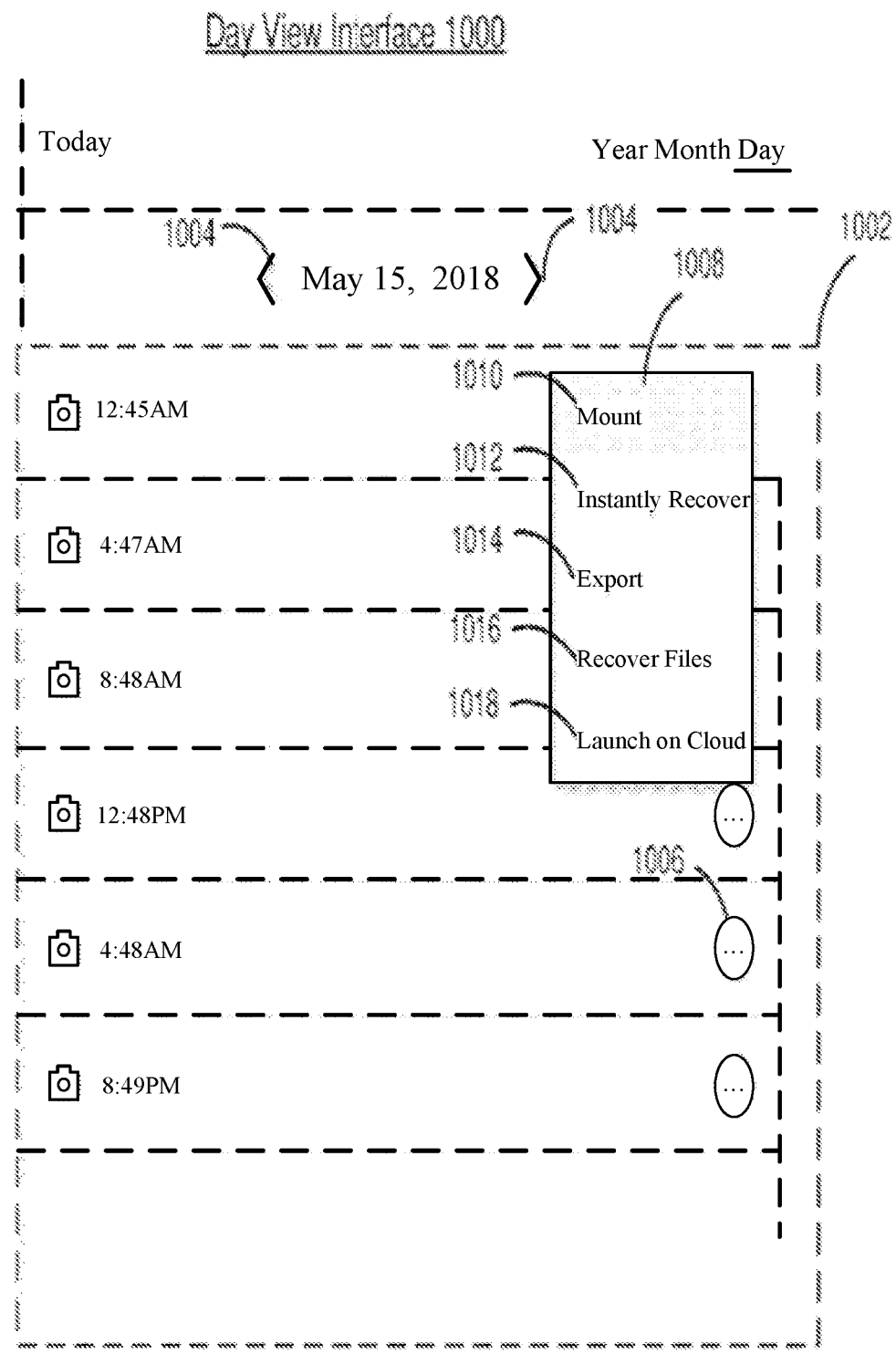
FIG. 10 is an example of a month view interface, according to one embodiment.

FIG. 10 is an example of a day view interface 1000, according to one embodiment. The discussion regarding the day view interface 700 of FIG. 7 may be applicable to the day view interface 1000. The day view interface 1000 includes a day snapshot display 1002 that provides a display of the snapshot jobs for the day and controls for managing the snapshot jobs. The day view interface 1000 includes day selection buttons 1004 for selecting the day that is displayed in the day snapshot display 1002. The day selection button 1004 on the left side selects a previous day to the day displayed in the day snapshot display 1002, and the day selection button 1004 on the right side selects a subsequent day to the day displayed in the day snapshot display 1002.

The day snapshot display 1002 includes a listing of snapshot jobs for a day. A snapshot time is indicated for each snapshot job. Other types of snapshot information may also be shown. For each snapshot job, the day snapshot display 1002 includes a snapshot management button 1006. Responsive to a selection of a snapshot management button 1006 for a snapshot, a snapshot manager 1008 may be provided to the interface to facilitate operations on the snapshot job. The snapshot manager 1008 includes a mount button 1010 that is used to mount a snapshot. A mount allows a snapshot chain (e.g., including full and incremental snapshots) to be materialized as a single snapshot that is subsequently exposed by the DMS cluster via a (e.g., network file system (NFS)) mount point. The materialized backup is then presented in the compute infrastructure as a new resource (e.g., DB server, VM hypervisor, etc.). The instantly recover button 1012 provides for a recovery using the snapshot. A recovery is like a mount except that the materialized backup is not created as a new resource on the compute infrastructure, and instead overwrites an existing resource in the compute infrastructure. The export button 1014 provides for exporting of the snapshot to a chosen storage location. The recover files button 1016 allows the admin to browse a snapshot. For example, an interactive explorer interface may be presented to allow the user to view the files and folders that were present when the snapshot was captured. Using the recover files browser, an admin can select files that need to be restored back to the resource and initiate the restore. The launch on cloud button 1018 provides for mounting of the snapshot in a cloud computing system separate from the compute infrastructure, such as the archive system 120. Each of the mount, instant recovery, export, recover files, and launch on cloud operations use a successful snapshot. The recover files operation uses a successful snapshot and an index.

Unlike the daily view interface 700, the day view interface 1000 does not include a week selection carousel 702. In that sense, various components of the interfaces discussed herein may be omitted.

Figure 11:
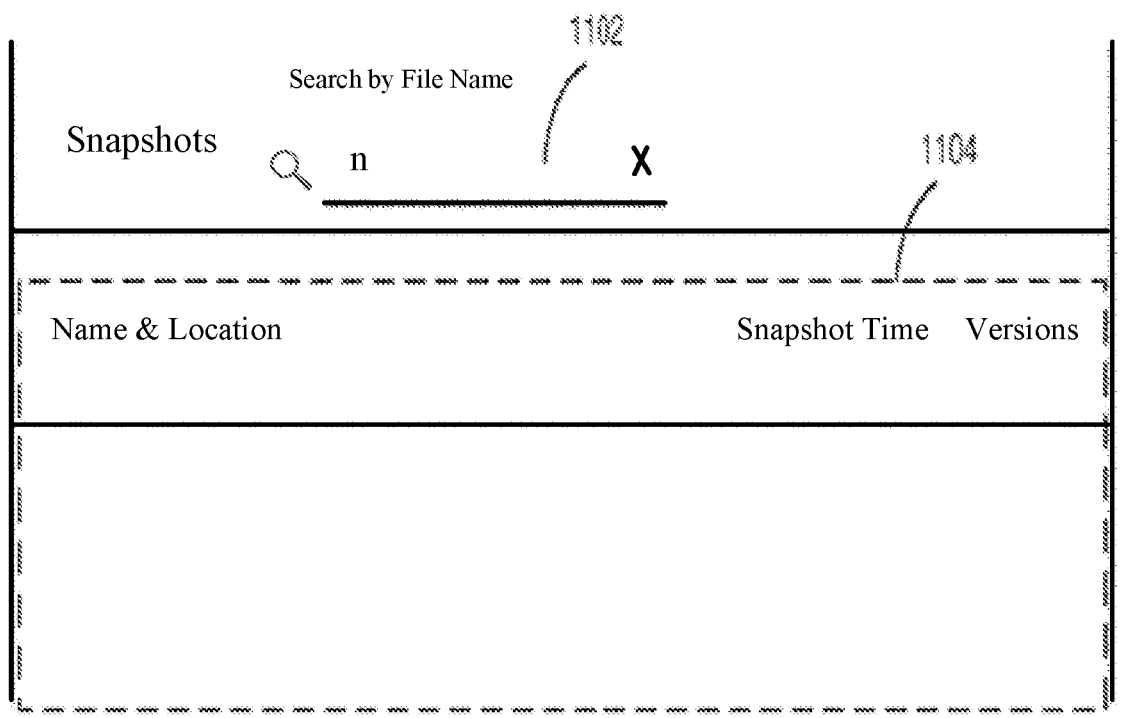
FIG. 11 is an example of a snapshot search interface, according to one embodiment.

FIG. 11 is an example of a snapshot search interface 1100, according to one embodiment. The snapshot search interface 1100 provides for searching for snapshots or snapshot jobs by file name. The snapshot search interface 1100 includes a search box 1102 that receives a search term, and a results display 1104 that indicates one or more files returned from a query to the DMS database 116 using the search term. For each file, the results display 1104 indicates the name and location, snapshot time, and snapshot versions of the file. The snapshot time indicates the time that the latest snapshot that includes the file was captured. The snapshot version indicates the number of snapshots of the file that have been captured.

In some embodiments, the snapshot search interface 1100 is integrated with a calendar view interface. For example, a button in a calendar view interface may provide a reference to the snapshot search interface 1100. In another example, a portion of a calendar view interface may be dedicated to the snapshot search interface 1100. In some embodiments, the snapshot search interface 1100 is an overlay window over a calendar view interface. In response to the entering of a search term in the search box 1102, the results display 1104 appears over the calendar view interface. If the search query is cleared, the results display 1106 is removed to expose the calendar view interface.

Figure 12:
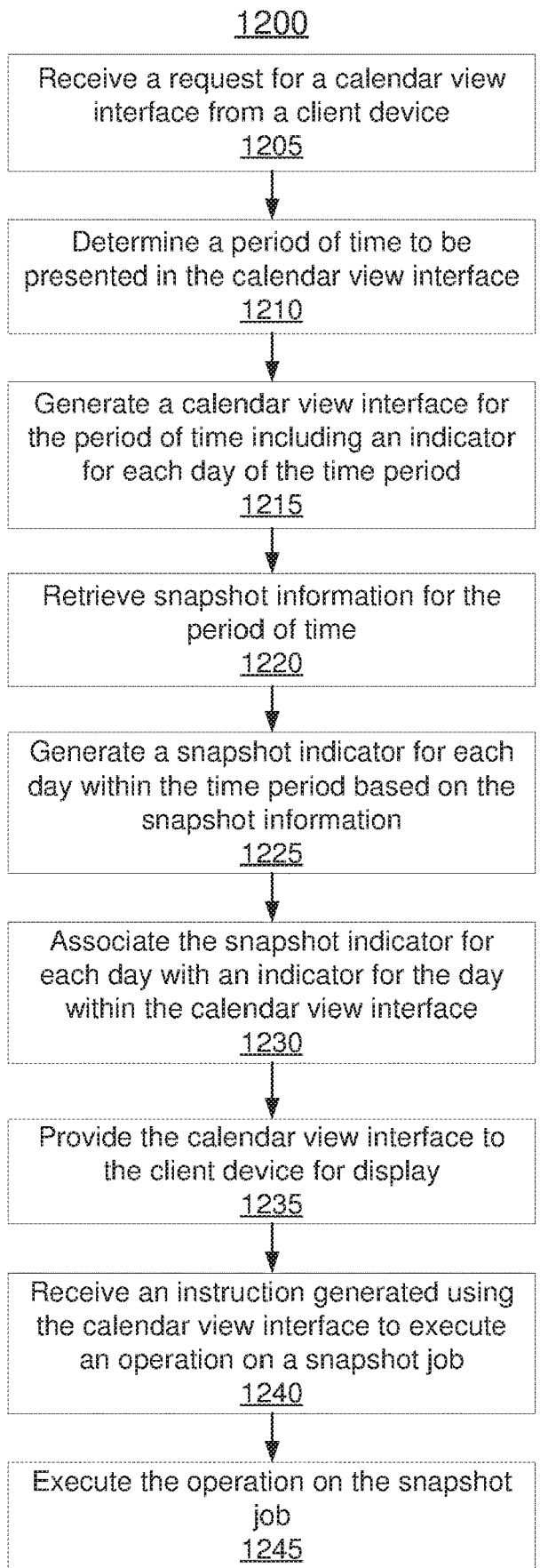
FIG. 12 is a flow chart of a process for providing a calendar view interface, according to one embodiment

FIG. 12 is a flow chart of a process 1200 for providing a calendar view interface, according to one embodiment. The process 1200 is discussed as being performed by a DMS node 114 of a DMS cluster 112, although other types of computing structures may be used. The process 1200 may include different and/or additional steps, or some steps may be in different orders.

A DMS node 114 receives 1205 a request for a calendar view interface from a client device 180. The client device 180 may be associated with the compute infrastructure 102, such as a tenant when the compute infrastructure 102 is a multi-tenant compute infrastructure. The client device 180 may request the calendar view interface using an application or a web browser.

The DMS node 114 determines 1210 a period of time to be presented in the calendar view interface. The period of time may be selected by the client device 180, or programmatically determined by the DMS node 114. In some embodiments, the period of time is determined based the type of calendar view interface (e.g., year, month, or day).

The DMS node 114 generates 1215 a calendar view interface for the period of time including an indicator for each day of the time period. If the period of time is a year, then the DMS node 114 may generate a year view interface. If the period of time is a month, then the DMS node 114 may generate a month view interface. If the period of time is a day or week, then the DMS node 114 may generate a day view interface. The calendar interface may include a display of the days within the time period. For the year view interface, each day of a year is displayed in a snapshot display of the interface. For the month view interface, each day of the month is displayed in a snapshot display of the interface. For the day view interface, each day of a week is displayed in a week selection carousel of the interface.

The calendar view interface may be formatted according to calendar data defining days, weeks, months, and years. For a year view interface, each month is presented separately, with the days of the month arranged in row of cells according to week. For a month view interface, the days of the month are arranged in rows of cells according to week. For a day view interface, the days of a week are displayed in a week selection carousel. For each day shown, an indicator for the day (e.g., a number defining the day of the month) is presented in the calendar view interface.

The DMS node 114 retrieves 1220 snapshot information for the period of time from a DMS database 116 of the DMS cluster 112. For example, the DMS node 114 may reference a service schedule 222 to determine the snapshot jobs that were attempted on each day within the time period. The DMS node 114 may reference a snapshot table 226 to determine snapshot status information indicating whether snapshot were successfully captured, unsuccessful, or still indexing. The DMS node 114 may retrieve various other snapshot information for the snapshot jobs of each day of the time period from the DMS database 116, such as snapshot type, snapshot time, detailed snapshot status information, crash consistency, and storage location.

In some embodiments, by only querying and receiving snapshot information for the days of the selected time period from the DMS database 116, the efficiency of generating the calendar view interface is increased.

The DMS node 114 generates 1225 a snapshot indicator for each day within the time period based on the snapshot information. For each day, the snapshot information includes the number of snapshot jobs, the number of snapshot jobs that were successfully captured, the number of snapshot jobs that failed to be successfully captured, and the number of snapshot jobs that are still indexing. The snapshot indicator presents this information in a graphical display, as shown in FIGS. 5 through 9.

The DMS node 114 associates 1230 the snapshot indicator for each day of the time period with an indicator for the day within the calendar view interface. The snapshot indicators may be displayed with a respective indicator for each day within a cell for the day, as shown in FIGS. 5 through 9. For a day view interface, the snapshot indicator for each day of a week may be shown in a week selection carousel, such as the week selection carousel 702 of the day view interface 700 shown in FIG. 7.

The DMS node 114 provides 1235 the calendar view interface to the client device 180 for display. The client device 180 may be a stationary device e.g., desktop, workstation, etc.) or a mobile device. The client device 180 includes one or more user input devices, such as a mouse, keyboard, touchscreen, etc., to interact with the calendar view interface. The interactions may include switching between different calendar view interfaces or time periods.

The DMS node 114 receives 1240 from the client device 180 an instruction generated using the calendar view interface to execute an operation on a snapshot job. For example, in response to a selection of a snapshot job in the calendar view interface (e.g., the snapshots shown in the day view interface 700 or day view interface 1000), a snapshot manager 1008 including the mount button 1010, the instantly recover button 1012, the export button 1014, the recover files button 1016, or the launch on cloud button 1018 may be provided to allow the client device 180 to select the corresponding operation to be performed.

The DMS node 114 executes 1245 the operation on the snapshot job. The operations may include the mount, instant recovery, export, recover file, or launch on cloud operations as discussed above in connection with FIG. 10. The calendar view provides for a chronological view of captured snapshots that is intuitive, and for launching additional operations for managing the snapshots. In that sense, the calendar view interface improves snapshot management and control of the operations of the DMS cluster 112.

Figure 13:
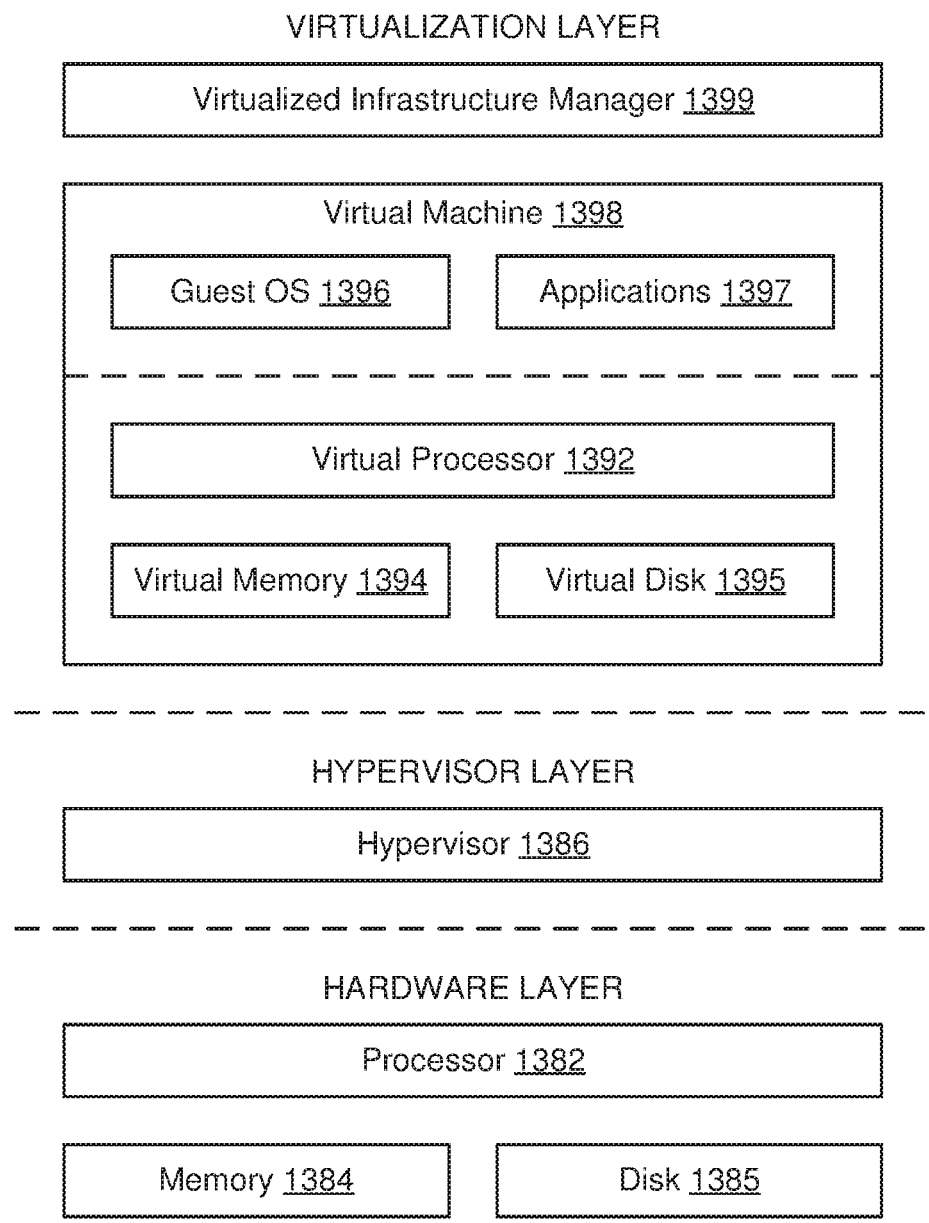
FIG. 13 is a block diagram of a virtual machine, according to one embodiment.

FIG. 13 is a block diagram of a server for a VM platform, according to one embodiment. The server includes hardware-level components and software-level components. The hardware-level components include one or more processors 1382, one or more memory 1384, and one or more storage devices 1385. The software-level components include a hypervisor 1386, a virtualized infrastructure manager 1399, and one or more virtual machines 1398. The hypervisor 1386 may be a native hypervisor or a hosted hypervisor. The hypervisor 1386 may provide a virtual operating platform for running one or more virtual machines 1398. Virtual machine 1398 includes a virtual processor 1392, a virtual memory 1394, and a virtual disk 1395. The virtual disk 1395 may comprise a file stored within the physical disks 1385. In one example, a virtual machine may include multiple virtual disks, with each virtual disk associated with a different file stored on the physical disks 1385. Virtual machine 1398 may include a guest operating system 1396 that runs one or more applications, such as application 1397. Different virtual machines may run different operating systems. The virtual machine 1398 may load and execute an operating system 1396 and applications 1397 from the virtual memory 1394. The operating system 1396 and applications 1397 used by the virtual machine 1398 may be stored using the virtual disk 1395. The virtual machine 1398 may be stored as a set of files including (a) a virtual disk file for storing the contents of a virtual disk and (b) a virtual machine configuration file for storing configuration settings for the virtual machine. The configuration settings may include the number of virtual processors 1392 (e.g., four virtual CPUs), the size of a virtual memory 1394, and the size of a virtual disk 1395 a 10 GB virtual disk) for the virtual machine 1395.

The virtualized infrastructure manager 1399 may run on a virtual machine or natively on the server. The virtualized infrastructure manager 1399 corresponds to the virtualization module 106 above and may provide a centralized platform for managing a virtualized infrastructure that includes a plurality of virtual machines. The virtualized infrastructure manager 1399 may manage the provisioning of virtual machines running within the virtualized infrastructure and provide an interface to computing devices interacting with the virtualized infrastructure. The virtualized infrastructure manager 1399 may perform various virtualized infrastructure related tasks, such as cloning virtual machines, creating new virtual machines, monitoring the state of virtual machines, and facilitating backups of virtual machines.

Figure 14:
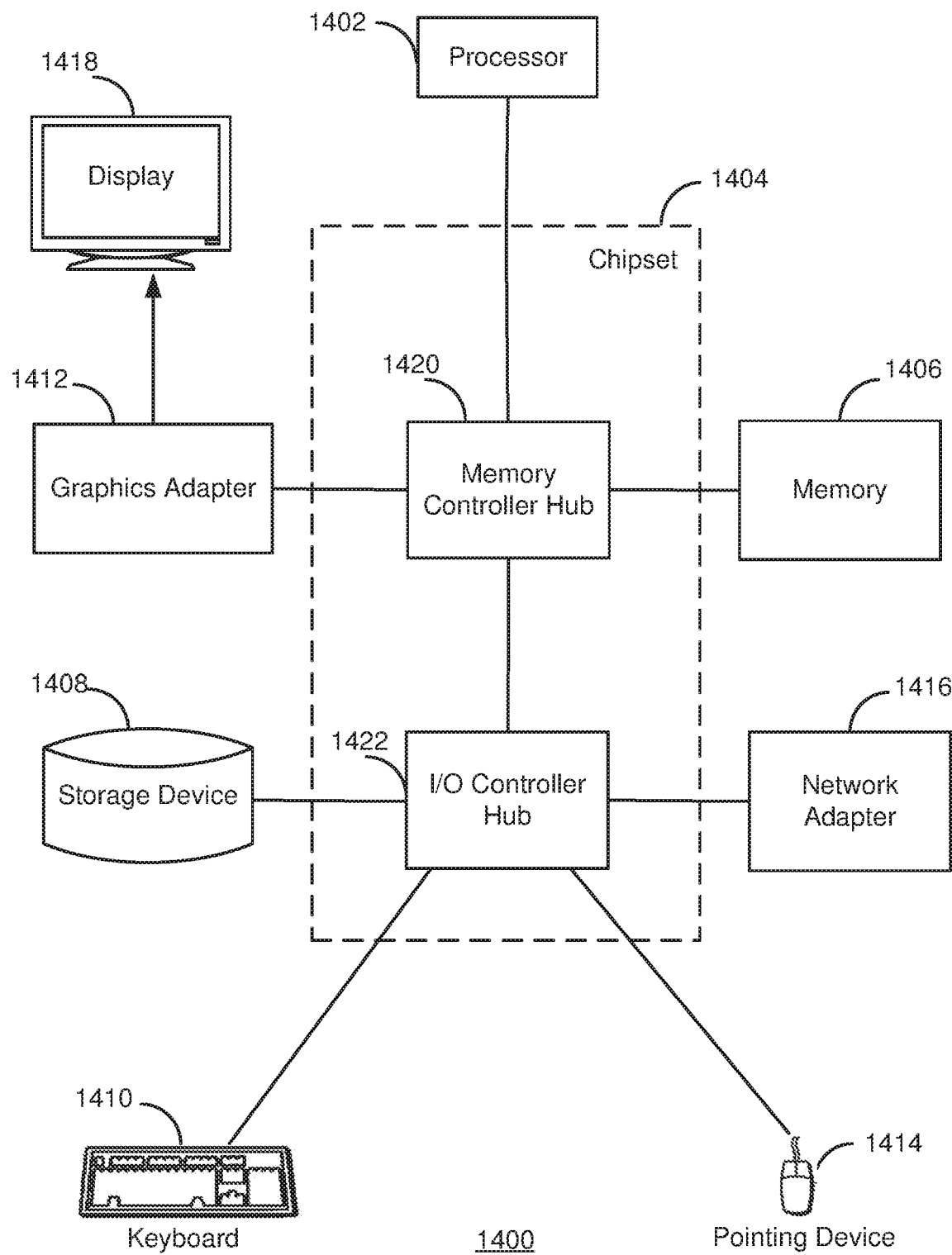
FIG. 14 is a block diagram of a computer system suitable for use in a DMS cluster or client device, according to one embodiment.

FIG. 14 is a high-level block diagram illustrating an example of a computer system 1400 for use as one or more of the components shown above, according to one embodiment. Illustrated are at least one processor 1402 coupled to a chipset 1404. The chipset 1404 includes a memory controller hub 1420 and an input/output (I/O) controller hub 1422. A memory 1406 and a graphics adapter 1412 are coupled to the memory controller hub 1420, and a display device 1418 is coupled to the graphics adapter 1412. A storage device 1408, keyboard 1410, pointing device 1414, and network adapter 1416 are coupled to the I/O controller hub 1422. Other embodiments of the computer 1400 have different architectures. For example, the memory 1406 is directly coupled to the processor 1402 in some embodiments.

The storage device 1408 includes one or more non-transitory computer-readable storage media such as a hard drive, compact disk read-only memory (CD-ROM), DVD, or a solid-state memory device. The memory 1406 holds instructions and data used by the processor 1402. The pointing device 1414 is used in combination with the keyboard 1410 to input data into the computer system 1400. The graphics adapter 1412 displays images and other information on the display device 1418. In some embodiments, the display device 1418 includes a touch screen capability for receiving user input and selections. The network adapter 1416 couples the computer system 1400 to a network. Some embodiments of the computer 1400 have different and/or other components than those shown in FIG. 14. For example, the virtual machine 104, the physical machine 108, and/or the DMS node 114 can be formed of multiple blade servers and lack a display device, keyboard, and other components.

The computer 1400 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 1408, loaded into the memory 1406, and executed by the processor 1402.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the scope of the invention.

The invention claimed is:

1. A computer-implemented method, at a compute infrastructure including a data management and storage (DMS) cluster, of providing a calendar view interface in a client device, the computer-implemented method including:
receiving a request for the calendar view interface from the client device;
determining a time period to be presented in the calendar view interface;
generating the calendar view interface for the time period including an indicator for each day of the time period, and a snapshot management button for a snapshot;
retrieving snapshot information for the time period;
generating respective snapshot indicators for each day within the time period based on the snapshot information, wherein a snapshot indicator of the respective snapshot indicators is for a day within the time period, wherein the snapshot indicator for the day indicates an overview of statuses of a set of snapshot jobs performed on the day to capture a state of a virtual machine, and wherein the snapshot indicator comprises a shape, a first portion of the shape having a first size corresponding to a first percentage indicating a first subset of the set of snapshot jobs that succeeded for the day and a second portion of the shape having a second size corresponding to a second percentage indicating a second subset of the set of snapshot jobs that failed for the day;

responsive to a selection of the snapshot management button, providing a snapshot manager to the calendar view interface to facilitate operations of a snapshot job, the snapshot manager including a mount button to mount the snapshot, and a launch on cloud button to mount the snapshot in a cloud computing system separate from the compute infrastructure;

receiving, via the mount button, a request to mount the snapshot;

responsive to the request to mount the snapshot, materializing a snapshot chain, including full and incremental snapshots, as a single snapshot to be exposed by the DMS cluster via a mount point; and presenting, in the calendar view interface, a materialized backup as a new resource in the compute infrastructure.

2. The computer-implemented method of claim 1, further comprising:
associating the snapshot indicator for each day with an indicator for the day within the calendar view interface.

3. The computer-implemented method of claim 1, further comprising:
providing the calendar view interface to the client device for display.

4. The computer-implemented method of claim 1, further comprising:
receiving an instruction generated using the calendar view interface to execute an operation on the snapshot job.

5. The computer-implemented method of claim 4, further comprising:
executing the operation on the snapshot job.

6. The computer-implemented method of claim 1, wherein:
a third portion of the shape indicates a percentage of the set of snapshot jobs that are in-progress for the day based at least in part on a size of the third portion.

7. The computer-implemented method of claim 1, wherein the statuses comprise an in-progress status that indicates an operation that is being executed or waiting to be executed.

8. The computer-implemented method of claim 1, wherein the statuses comprise a canceled status that indicates a user that canceled the snapshot job and a time of cancellation.

9. The computer-implemented method of claim 1, wherein the statuses comprise a failed status that indicates a reason for a failure of the snapshot job.

10. A system for providing a calendar view interface in a client device, the system comprising:
a memory; and
at least one processor coupled with the memory and configured to cause the system to:
receive a request for the calendar view interface from the client device;
determine a time period to be presented in the calendar view interface;
generate the calendar view interface for the time period including an indicator for each day of the time period, and a snapshot management button for a snapshot;
retrieve snapshot information for the time period;
generate respective snapshot indicators for each day within the time period based on the snapshot information, wherein a snapshot indicator of the respective snapshot indicators is for a day within the time period, wherein the snapshot indicator for the day indicates an overview of statuses of a set of snapshot jobs performed on the day to capture a state of a virtual machine, and wherein the snapshot indicator comprises a shape, a first portion of the shape having a first size corresponding to a first percentage indicating a first subset of the set of snapshot jobs that succeeded for the day and a second portion of the shape having a second size corresponding to a second percentage indicating a second subset of the set of snapshot jobs that failed for the day;
responsive to a selection of the snapshot management button, provide a snapshot manager to the calendar view interface to facilitate operations of a snapshot job, the snapshot manager including a mount button to mount the snapshot, and a launch on cloud button to mount the snapshot in a cloud computing system separate from a compute infrastructure;
receive, via the mount button, a request to mount the snapshot;
responsive to the request to mount the snapshot, materialize a snapshot chain, including full and incremental snapshots, as a single snapshot to be exposed by a DMS cluster via a mount point; and
present, in the calendar view interface, a materialized backup as a new resource in the compute infrastructure.

11. The system of claim 10, wherein the at least one processor is further configured to cause the system to:
associate the snapshot indicator for each day with an indicator for the day within the calendar view interface.

12. The system of claim 10, wherein the at least one processor is further configured to cause the system to:
provide the calendar view interface to the client device for display.

13. The system of claim 10, wherein the at least one processor is further configured to cause the system to:
receive an instruction generated using the calendar view interface to execute an operation on the snapshot job.

14. The system of claim 13, wherein the at least one processor is further configured to cause the system to:
execute the operation on the snapshot job.

15. A non-transitory, machine-readable medium storing instructions for providing a calendar view interface in a client device, wherein the instructions are executable by a processor to:
receive a request for the calendar view interface from the client device;
determine a time period to be presented in the calendar view interface;
generate the calendar view interface for the time period including an indicator for each day of the time period, and a snapshot management button for a snapshot;
retrieve snapshot information for the time period;
generate respective snapshot indicators for each day within the time period based on the snapshot information, wherein a snapshot indicator of the respective snapshot indicators is for a day within the time period, wherein the snapshot indicator for the day indicates an overview of statuses of a set of snapshot jobs performed on the day to capture a state of a virtual machine, and wherein the snapshot indicator comprises a shape, a first portion of the shape having a first size corresponding to a first percentage indicating a first subset of the set of snapshot jobs that succeeded for the day and a second portion of the shape having a second size corresponding to a second percentage indicating a second subset of the set of snapshot jobs that failed for the day;

responsive to a selection of the snapshot management button, provide a snapshot manager to the calendar view interface to facilitate operations of a snapshot job, the snapshot manager including a mount button to mount the snapshot, and a launch on cloud button to mount the snapshot in a cloud computing system separate from a compute infrastructure;

receive, via the mount button, a request to mount the snapshot;

responsive to the request to mount the snapshot, materialize a snapshot chain, including full and incremental snapshots, as a single snapshot to be exposed by a DMS cluster via a mount point; and present, in the calendar view interface, a materialized backup as a new resource in the compute infrastructure.

16. The non-transitory, machine-readable medium of claim 15, wherein the instructions are further executable by the processor to:

associate the snapshot indicator for each day with an indicator for the day within the calendar view interface.

17. The non-transitory, machine-readable medium of claim 16, wherein the instructions are further executable by the processor to:

provide the calendar view interface to the client device for display.

18. The non-transitory, machine-readable medium of claim 16, wherein the instructions are further executable by the processor to:

receive an instruction generated using the calendar view interface to execute an operation on the snapshot job.

19. The non-transitory, machine-readable medium of claim 18, wherein the instructions are further executable by the processor to:

execute the operation on the snapshot job.

\* \* \* \* \*